(12) United States Patent
Nagarkar

(10) Patent No.: US 8,244,914 B1
(45) Date of Patent: Aug. 14, 2012

(54) SYSTEMS AND METHODS FOR RESTORING EMAIL DATABASES

(75) Inventor: Kuldeep Nagarkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 380 days.

(21) Appl. No.: 12/533,887

(22) Filed: Jul. 31, 2009

(51) Int. Cl.
*G06F 15/16* (2006.01)

(52) U.S. Cl. ........ 709/248; 709/206; 709/217; 709/218; 709/219; 707/609; 707/686

(58) Field of Classification Search .................. 709/206, 709/217, 218, 219, 248; 707/609, 686
See application file for complete search history.

(56) References Cited

U.S. PATENT DOCUMENTS

| 7,680,843 | B1 * | 3/2010 | Panchbudhe et al. ... 707/999.204 |
| 2008/0028007 | A1 * | 1/2008 | Ishii et al. ..................... 707/204 |

OTHER PUBLICATIONS

Spurzem, Bob; "Mimosa Brings the Magic to Exchange!;" Feb. 25, 2009; Mimosa Systems; http://www.mimosasystems.com/blog/archiving/mimosa-brings-the-magic-to-exchange/.
SnapManager for Microsoft Exchange; (accessed on Jul. 30, 2009); http://www.netapp.com/us/products/management-software/snapmanager-exchange.html.

\* cited by examiner

*Primary Examiner* — Liangche A Wang
(74) *Attorney, Agent, or Firm* — Advantedge Law Group

(57) ABSTRACT

A method may include creating a backup image of an email database. The method may also include archiving a set of email objects in the backup image by, for each email object in the set of email objects: (1) moving the email object from the backup image to an archival data store; and (2) providing, in the backup image, a shortcut that identifies a location of the email object in the archival data store. The method may further include receiving a request to restore the email database and restoring the email database from the backup image by, for each email object in the set of email objects, restoring the shortcut to the email object instead of restoring the email object. Various other methods, systems, and computer-readable media are also disclosed.

19 Claims, 5 Drawing Sheets

SYSTEMS AND METHODS FOR RESTORING EMAIL DATABASES

BACKGROUND

Enterprises face various challenges in recovering email data, particularly when an email server, such as a MICROSOFT EXCHANGE server, goes down. The time needed to restore an email database is typically directly proportional to the size of the database. Thus, in the event of a failure, large databases may experience significant down time.

Various data recovery technologies are available to increase recovery time of email databases. For example, some recovery systems maintain snapshots, use a Continuous Data Protection ("CDP") data-store, and/or provide instant export of a database image over a network. Unfortunately, these solutions may be resource intensive and/or may not significantly improve email down time. For example, maintaining snapshots and a using CDP data store may result in significant storage costs. Furthermore, instant export functionality may involve resynchronization of changes from an exported image (i.e., for performance reasons and/or general data protection policies that apply to a production storage stack.) Another problem with instant export solutions is that an image may only be exported if it exists on disk, and exporting may not be possible for some images (i.e., images in Software as a Service ("SaaS") due to performance constraints. What is needed, therefore, is a more efficient and effective solution for recovering email databases.

SUMMARY

As will be described in greater detail below, the instant disclosure generally relates to systems and methods for restoring email databases. Embodiments of the instant disclosure provide more efficient and effective restoration of email databases than conventional restoration solutions. For example, a method for restoring email databases may include creating a backup image of an email database and archiving a set of email objects in the backup image by, for each email object in the set of email objects, providing, in the backup image, a shortcut that identifies a location of the email object in the archival data store and moving the email object from the backup image to an archival data store. The method may also include providing, in the backup image, a shortcut that identifies a location of the email object in the archival data store. The method may further include receiving a request to restore the email database and restoring the email database from the backup image by, for each email object in the set of email objects, restoring the shortcut to the email object instead of restoring the email object.

In some embodiments, restoring the email database may include providing a user with access to each email in the email database. In at least one embodiment, archiving the set of email objects in the backup image may include loading the backup image into an email application, and the archiving may be performed by the email application. The email application may include an email exchange application and the email database may include an email exchange server database.

In some embodiments, the method may include restoring each email object from the archival data store after restoring the email database from the backup image. In certain embodiments, archiving the set of email objects may include archiving each email object in the backup image. Additionally or alternatively, archiving the set of email objects in the backup image may result in one or more email messages in the backup image that consist of message metadata and one or more shortcuts to one or more email objects. According to various embodiments, providing the shortcut may include limiting a size of the shortcut to a size requested by a user. For example, a user (e.g., an administrator) may interface with a graphical user interface to provide shortcut size limits and/or other information relevant to creating a backup image.

In certain embodiments, a system may include at least one processor, an archival data store, a backup module, an email server module, and a restoration module. The backup module may be programmed to direct the processor to create a backup image of an email database. The email server module may be programmed to direct the processor to archive a set of email objects in the backup image by, for each email object in the set of email objects: (1) moving the email object from the backup image to the archival data store, and (2) providing, in the backup image, a shortcut that identifies a location of the email object in the archival data store. The restoration module may be programmed to direct the processor to receive a request to restore the email database and to restore the email database from the backup image by, for each email object in the set of email objects, restoring the shortcut to the email object instead of restoring the email object.

In some embodiments, the system may include a first email server that comprises the email database before a disaster compromises the email database and a backup server that comprises the backup image. In such embodiments, the backup module may create the backup image by copying data from the email database on the first email server to the backup image on the backup server. The system may also include a second email server remote from the first email server. The second email server may include the email server module. In some embodiments, the backup server may comprise the second email server.

According to various embodiments, the email server module may be programmed to archive the set of email objects in the backup image by loading the backup image into an email application. In such embodiments, the archiving may be performed by the email application. In various embodiments, the email server module may include an email exchange application and the email database may include an email exchange server database. Additionally or alternatively, the restoration module may be programmed to restore each email object from the archival data store after restoring the email database from the backup image.

In some embodiments, after the set of email objects has been archived, one or more email messages in the backup image may consist of message metadata and one or more shortcuts to one or more email objects. In certain embodiments, the system may include a user interface programmed to receive a request from a user to limit a size of each shortcut.

According to certain embodiments, a computer-readable-storage medium may include one or more computer-executable instructions that, when executed by a computing device, cause the computing device to (1) create a backup image of an email database, (2) archive a set of email objects in the backup image by, for each email object in the set of email objects, moving the email object from the backup image to an archival data store and providing, in the backup image, a shortcut that identifies a location of the email object in the archival data store, (3) receive a request to restore the email database, and (4) restore the email database from the backup image by, for each email object in the set of email objects, restoring the shortcut to the email object instead of restoring the email object.

In at least one embodiment, the one or more computer-executable instructions are programmed to cause the computing device to load the backup image into an email application to prepare the set of email objects in the backup image to be archived. Additionally or alternatively, the one or more computer-executable instructions may be programmed to cause the computing device to restore each email object from the archival data store after restoring the email database from the backup image. According to certain embodiments, the email application comprises an email exchange application and the email database comprises an email exchange server database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
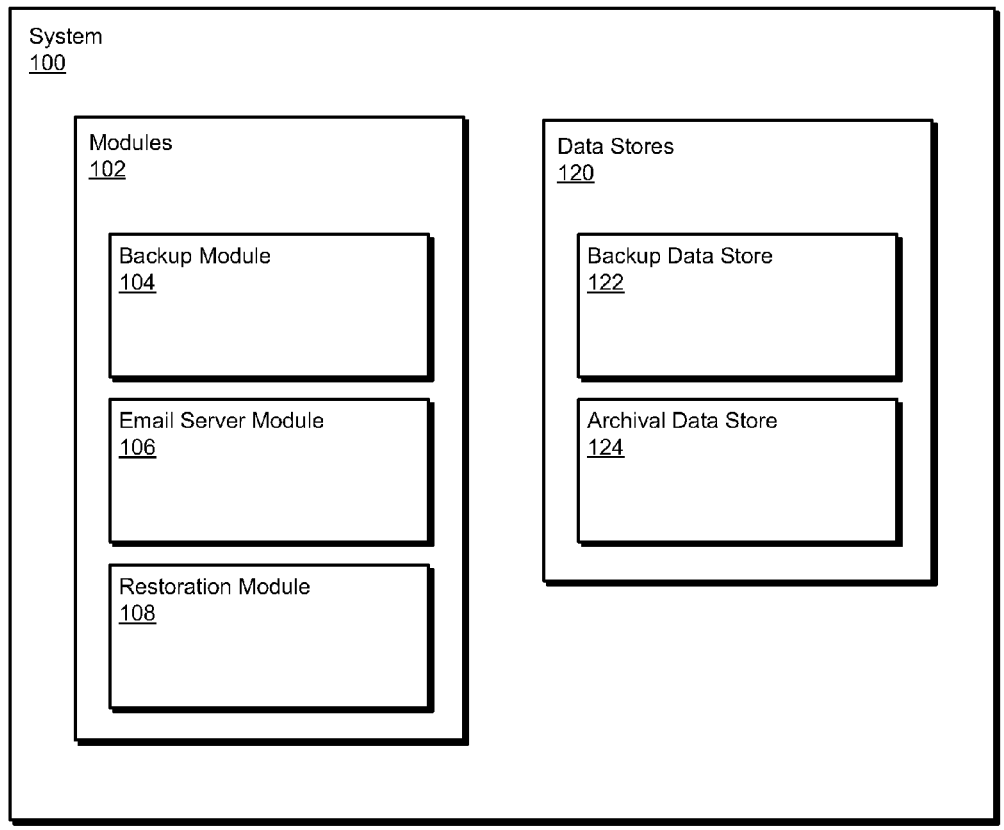
FIG. 1 is a block diagram of an exemplary system for restoring email databases.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restoring email databases. Embodiments of the instant disclosure may restore an email database more efficiently and effectively than conventional restoration solutions by creating email database backup images that may be smaller than backup images traditionally used for email database restoration. Such backup images may be created by archiving email objects in the backup image. Email objects may be archived by moving the email objects from the backup image to an archival data store and replacing the objects with a shortcut that identifies a location of the email object in the archival data store.

Figure 2:
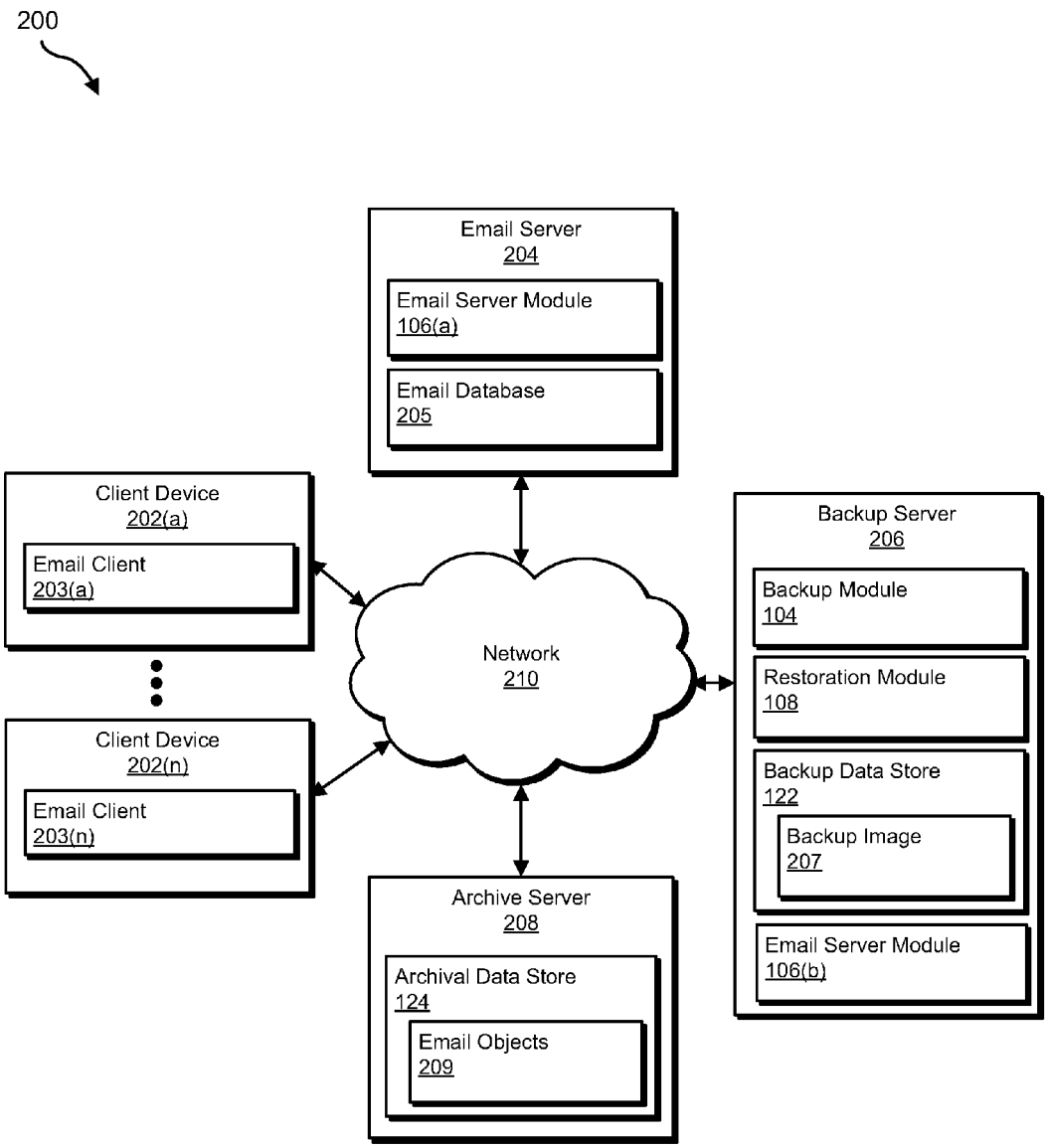
FIG. 2 is a block diagram of an exemplary system for restoring email databases.

The following will provide, with reference to FIGS. 1-2, detailed descriptions of exemplary systems for restoring email databases. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for restoring email databases. As illustrated in this figure, exemplary system 100 may include one or more modules 102 for performing one or more tasks. For example, and as will be explained in greater detail below, exemplary system 100 may include a backup module 104 programmed to create a backup image of an email database. Exemplary system 100 may also include an email server module 106 programmed to archive a set of email objects in a backup image by, for each email object in the set of email objects: (1) moving the email object from the backup image to an archival data store, and (2) providing, in the backup image, a shortcut that identifies a location of the email object in the archival data store.

In addition, and as will be described in greater detail below, exemplary system 100 may include a restoration module 108 programmed to receive a request to restore an email database. Restoration module 108 may also be programmed to restore an email database from a backup image by, for each email object in a set of email objects, restoring a shortcut to the email object instead of restoring the email object. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as one or more of the devices illustrated in FIG. 2, computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more data stores 120. Data stores 120 may represent portions of a single data store or computing device or a plurality of data stores or computing devices. In one embodiment, exemplary system 100 may include a backup data store 122 for storing one or more email database backup images. Exemplary system 100 may also include an archival data store 124 for storing one or more email objects archived from an email database backup image. In some embodiments, archival data store 124 may be a Hierarchical Storage Management ("HSM") system.

Data stores 120 in FIG. 1 may represent a portion of one or more computing devices. For example, data stores 120 may represent a portion of backup server 206 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as backup server 206 in FIG. 2, archive server 208 in FIG. 2, computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include client devices 202(a)-(n), an email server 204, a backup server 206, an archive server 208, and a network 210. Client devices 202(a)-(n) may represent devices of different users and/or multiple devices of a single user. Client devices 202(a)-(n) may include email clients 203(a)-(n), respectively. Email clients 203(a)-(n) may include any suitable type of client that serves as a frontend for managing email. For example, email clients 203(a)-(n) may include MICROSOFT OUTLOOK clients, OUTLOOK EXPRESS clients, NETSCAPE MESSENGER clients, GOOGLE GMAIL clients, web-based email clients, and/or various other types of email clients.

Email server 204 may include an email server module 106(a) and email database 205. Email server module 106(a) may include any suitable type of email exchange server program, such as MICROSOFT EXCHANGE, GOOGLE APPS, MDAEMON PRO, IPSWITCH COLLABORATION SUITE, KERIO MAILSERVER, ZIMBRA, and/or any other type of email service software. As used herein, the phrase "email exchange server program" generally refers to any program for syncing emails between devices and systems. In other embodiments, email server module 106 may be any other type of software program that provides email services. An email database, such as email database 205, may include any database and/or data storage mechanism for storing, managing, syncing, transferring, and/or otherwise handling one or more emails. In some embodiments, email database 205 may include an email exchange database. Email database 205 may also include any other type of email database.

Backup server 206 may include backup module 104, restoration module 108, backup data store 122, and an email server module 106(b). In some embodiments email server modules 106(a) and 106(b) may be instances of the same email application. Alternatively, email server modules 106(a) and 106(b) may be compatible email applications (e.g., different versions of the same email application). Backup data store 122 may include one or more backup images, such as backup image 207. As used herein, the phrase "backup image" generally refers to a copy (e.g., a backup) of an email database. For example, a backup image, such as backup image 207, may include one or more emails and/or one or more email objects. In some embodiments, a backup image may include a full image of a computing device that includes an email database (e.g., an image of email server 204). Additionally or alternatively, a backup image may be an image of only an email database or a portion of an email database.

FIG. 2 also shows that archive server 208 may include archival data store 124 and email objects 209. As used herein, the phrase "email object" may refer to any text, attachment, and/or other data associated with an email. For example, an email object may be all or a portion of the text of an email, an attachment included with an email, and/or an image or other media file embedded in an email.

While FIG. 2 shows email server 204, backup server 206, and archive server 208 as being separate, the functionality of these devices may be implemented in a single system or set of systems configured in a different manner than is depicted in FIG. 2.

One or more of client devices 202(a)-(n) may manage email through communication with email server 204. For example, email clients 203(a)-(n) on client devices 202(a)-(n) may communicate with email server module 106(a) to sync with email database 205, and email database 205 may store multiple emails and email objects. Backup module 104 may backup email database 205 in backup image 207 of backup data store 122. Backup module 104 may cause email server module 106(b) to archive email objects in backup image 207. The email objects may be archived to archival data store 124 as email objects 209, and email server module 106(b) may replace the email objects in backup image 207 with shortcuts to archival data store 124. At a later point in time, restoration module 108 may restore email database 205 by using backup image 207, as will be discussed in greater detail below.

Client devices 202(a)-(n) generally represent any type or form of computing devices capable of reading computer-executable instructions. Examples of client devices 202(a)-(n) include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Email server 204, backup server 206, and archive server 208 generally represent any type or form of computing device that is capable of performing one or more of the steps for restoring email databases discussed in the instant disclosure. Examples of email server 204, backup server 206, and archive server 208 include, without limitation, application servers and database servers configured to provide various database services and/or run certain software applications.

Client devices 202(a)-(n), email server 204, backup server 206, and archive server 208 may communicate over network 210. Network 210 generally represents any medium or architecture capable of facilitating communication or data transfer. Examples of network 210 include, without limitation, an intranet, a wide area network ("WAN"), a local area network ("LAN"), a personal area network ("PAN"), the Internet, power line communications ("PLC"), a cellular network (e.g., a GSM Network), exemplary network architecture 500 in FIG. 5, or the like. Network 210 may facilitate communication or data transfer using wireless or wired connections.

Figure 3:
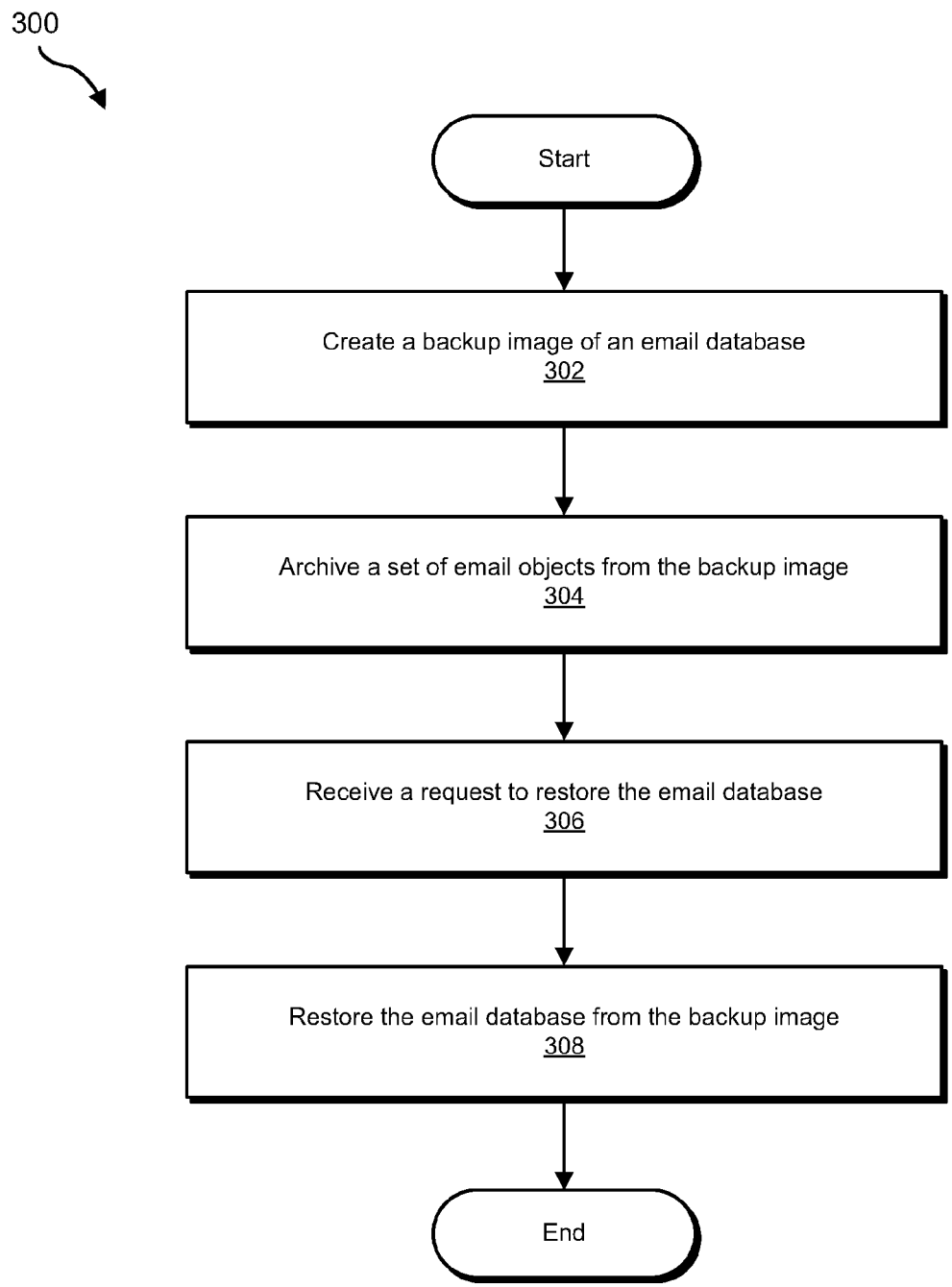
FIG. 3 is a flow diagram of an exemplary method for restoring email databases.

FIG. 3 is a flow diagram of an exemplary computer-implemented method 300 for restoring email databases. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 backup module 104 may, as part of backup server 206, create a backup image of an email database. Backup module 104 may create a backup image of an email database in a variety of ways. For example, backup module 104 may create a backup image of the email database as part of a periodically-scheduled backup. Additionally or alternatively, backup module 104 may create the backup image of the email database at the request of a user or other software application. The backup image may be created using any suitable imaging and/or backup technology.

The backup image may be loaded into an email application, such as email server module 106, to prepare for archiving email objects from the backup image. Then, at step 304 email server module 106(b) may archive a set of email objects from the backup image. Email server module 106(b) may archive each email object in the set of email objects by moving each email object from the backup image to an archive data store and providing a shortcut that identifies a location of each email object in the archival data store.

Email server module 106(b) may move the set of email objects in a variety of manners. For example, email server module 106(b) may move the set of objects by transferring the set of objects to archive server 208 for storage in archival data store 124. As used herein, the phrase "set of email objects" generally refers to one or more email objects. In some embodiments, the set of email objects may include each email object in the backup image. Alternatively, the set of email objects may include a subset of email objects in the backup image. For example, the set of email objects may include only objects that are larger than a predetermined size.

As previously noted, in addition to moving each email object in the set of email objects from the backup image to the archival data store, email server module 106(b) may provide, in the backup image, a shortcut that identifies the location of the email in the archival data store. The shortcut may include any information that identifies the location where the object was moved. For example, the shortcut may include a link (e.g., a hyperlink), a directory path, and/or any other information identifying where the object was moved. In some embodiments, the shortcut may be limited to a size requested by a user. Thus, a user may leverage the shortcuts to effectively manage storage space used for backup images.

Email server module 106(b) may archive the set of email objects using any suitable archiving technology and/or protocol. For example, email server module 106(b) may use an archiving protocol native to email server module 106(b) to archive the set of email objects. Alternatively, email server module 106(b) may use a plug-in or other software application to archive the set of email objects in the backup image.

In some embodiments, after the set of email objects in the backup image is archived, the backup image may be a skeleton image that includes only email header information and shortcuts to email objects. In other embodiments, the backup image may include some email objects and/or other data. For example, the backup image may include email objects smaller than a predetermined size, such as a predetermined amount of text for each email message to allow a user to discern the context of the email message. Thus, as previously noted, the set of email objects in the backup image that are archived may be a subset of all email objects in the backup image. In such embodiments, after the set of email objects in the backup image are archived, the backup image may be a partial skeleton image that includes email header information, shortcuts to email objects, and email objects smaller than a predetermined size.

At step 306, restoration module 108 may receive a request to restore the email database. The request may be received from an administrator or a restoration software application. In some embodiments, the request may be made after a hardware or software failure that compromises the email database. The request may also be made in a variety of other situations. For example, the request may be made in an attempt to return the email database to a state from a previous point in time.

In response to the request, instead of restoring the entire email database and all its objects, which may be time and resource intensive, restoration module 108 may restore the email database from the backup image by, for each email object in the set of email objects, restoring the shortcut to the email object instead of restoring the email object. In other words, restoration module 108 may restore a skeleton image (or partial skeleton image) created by archiving the set of email objects.

Restoring a skeleton image or partial skeleton image may be significantly faster than restoring a full backup image. Thus, embodiments of the present disclosure may provide for email databases to be brought online relatively quickly after a disaster. Furthermore, since skeleton images are smaller than full images, restoring a skeleton image may consume less network and other computing resources during a restoration process.

The following disclosure provides an example of how the process illustrated in FIG. 3 and the system illustrated in FIG. 2 may be used to restore a MICROSOFT EXCHANGE database. In this example, email clients 203(a) through (n) may be MICROSOFT OUTLOOK programs, email server modules 106(a) and (b) may be MICROSOFT EXCHANGE programs, and email database 205 may be a MICROSOFT EXCHANGE database that syncs with email clients 203(a) through (n).

Backup module 104 may backup email database 205 in backup data store 122 as backup image 207. Backup server 206 may load backup image 207 into email server module 106(b) and may direct email server module 106(b) to archive a set of data objects from backup image 207 to archival data store 124 to provide email objects 209 in archival data store 124, thereby making backup image 207 a skeleton image.

Email database 205 may become corrupted, and in response backup module 104 may restore email database 205 to email server 204 using backup image 207. As soon as backup image 207 is restored to email sever 204, email server module 106(a) may online the backup image even thought the backup image only contains shortcuts to the archived objects rather than the archived objects themselves. Once the backup image is online, users of client devices 202(a)-(n) may have access to each email of restored email database 205. Furthermore, email objects from backup image 207 that were archived may be accessed by a user through restored email database 205 by an means used for accessing archived objects (e.g., clicking on a shortcut to the archived object).

In some embodiments, storage space may be optimized by ensuring that a skeleton image or partial skeleton image may be the only backup image of the email database. In other words, after email objects are archived from the backup image, a full image that contains the archived email objects may not exist. In such embodiments, the backed-up email objects may only reside in an archival data store.

In various embodiments, after restoring the email database from the backup image, restoration module 108 may restore each email object from the archival data store to the restored email database. The process of restoring the email database from the archival data store may be done in the background. In other embodiments, the email objects in the archival database may only be restored from the archival data store on an as-needed basis (e.g., when a user requests access to an object). In some embodiments, an administrator may be able to decide whether to restore the archived email objects or not.

Figure 4:
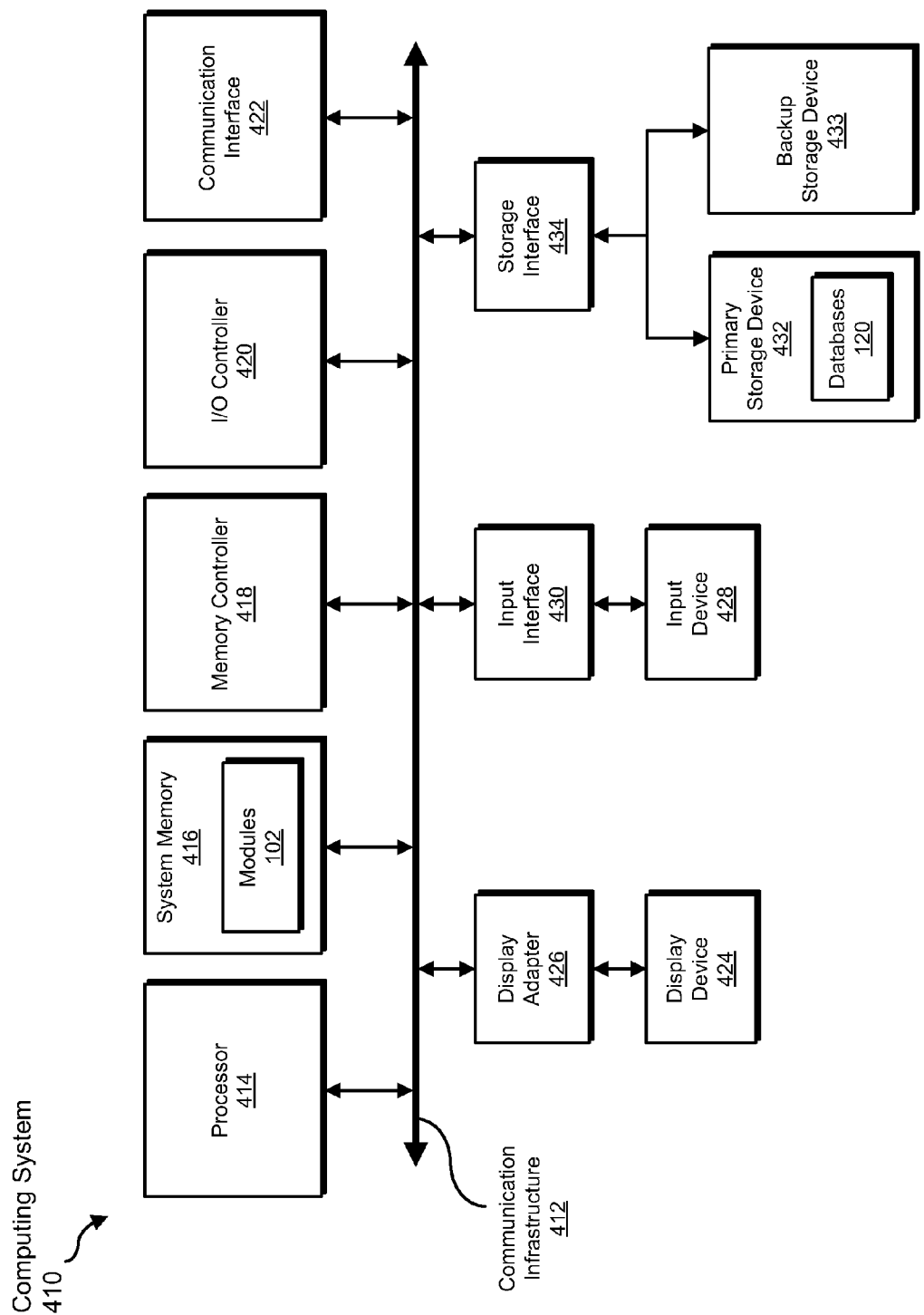
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the creating, archiving, moving, providing, receiving, and restoring steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as creating, archiving, moving, providing, receiving, and restoring.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the creating, archiving, moving, providing, receiving, and restoring steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the creating, archiving, moving, providing, receiving, and restoring steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the creating, archiving, moving, providing, receiving, and restoring steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the creating, archiving, moving, providing, receiving, and restoring steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
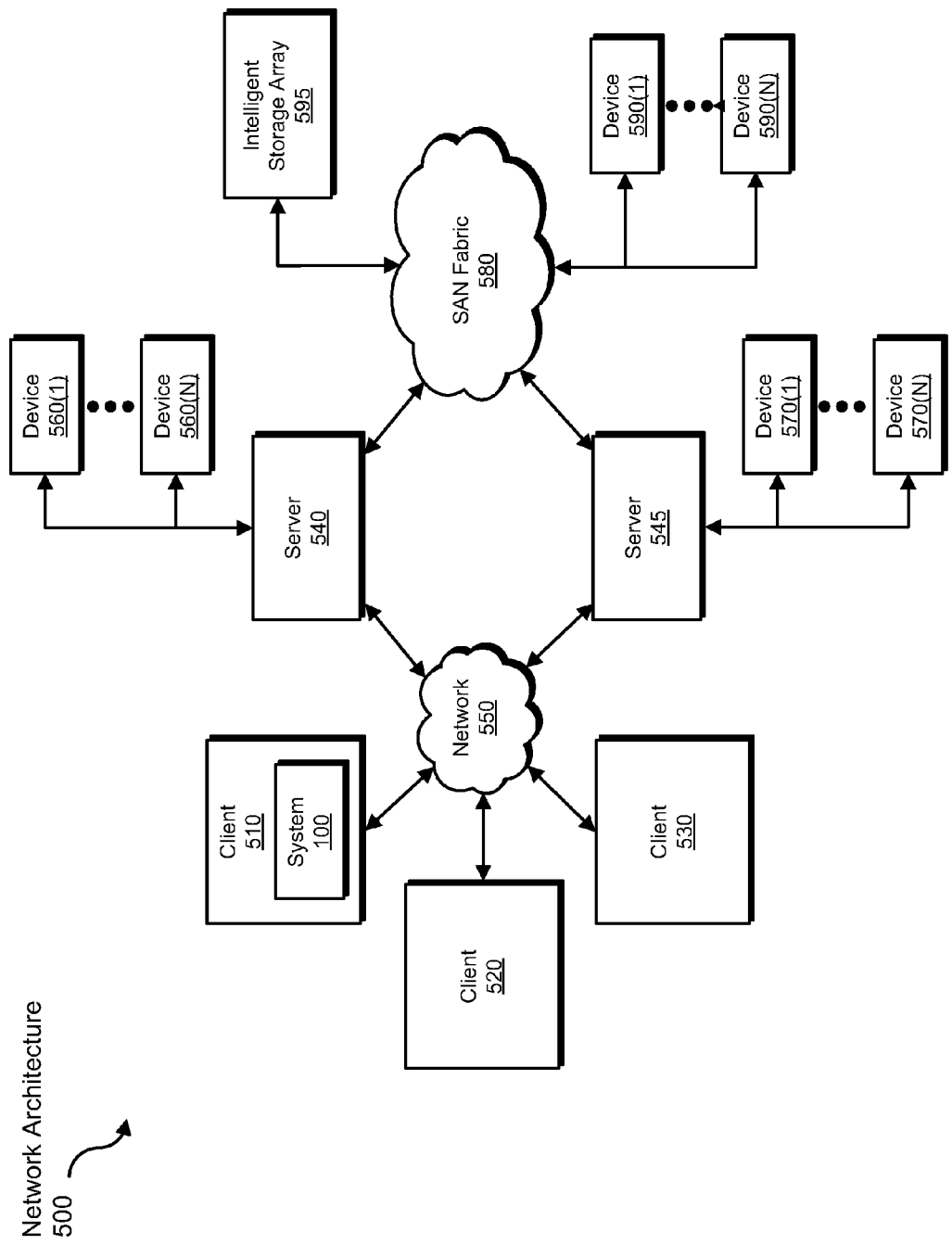
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the creating, archiving, moving, providing, receiving, and restoring steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for restoring email databases.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 may transform a full backup image of an email database into a skeleton image of the email database.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring email databases, at least a portion of the method being performed by a computing device comprising at least one processor, the method comprising:
   creating a backup image of an email database;
   archiving one or more objects from a set of email objects in the backup image by, for each email object in the set of email objects:
      determining whether the email object is smaller than a predetermined size;
      if the email object is smaller than the predetermined size, leaving the email object in the backup image;
      if the email object is larger than the predetermined size, moving the email object from the backup image to an archival data store and providing, in the backup image, a shortcut that identifies a location of the email object in the archival data store;
   receiving a request to restore the email database;
   restoring the email database from the backup image by, for each archived email object in the set of email objects, restoring the shortcut to the email object instead of restoring the email object.

2. The method of claim 1, wherein:
   restoring the email database comprises providing a user with access to each email in the email database;
   the email database from the backup image comprises a skeleton image that includes email header information for each email and shortcuts to the emails objects in the archival data store.

3. The method of claim 1, wherein:
   archiving the one or more objects from the set of email objects in the backup image comprises loading the backup image into an email application;
   the archiving is performed by the email application in accordance with a protocol native to the email application.

4. The method of claim 3, wherein:
   the email application comprises an email exchange application;
   the email database comprises an email exchange server database.

5. The method of claim 1, further comprising:
   after restoring the email database from the backup image, restoring each email object from the archival data store.

6. The method of claim 1, wherein:
   archiving the one or more objects from the set of email objects in the backup image results in one or more email messages in the backup image that consist of message metadata and one or more shortcuts to one or more email objects.

7. The method of claim 1, wherein:
   creating the backup image of the email database comprises storing the backup image in a backup data store.

8. A system comprising:
   at least one processor;
   an archival data store;
   a backup module programmed to direct the processor to create a backup image of an email database;
   an email server module programmed to direct the processor to archive one or more objects from a set of email objects in the backup image by, for each email object in the set of email objects:

determining whether the email object is smaller than a predetermined size;

if the email object is smaller than the predetermined size, leaving the email object in the backup image;

if the email object is larger than the predetermined size, moving the email object from the backup image to the archival data store, and providing, in the backup image, a shortcut that identifies a location of the email object in the archival data store;

a restoration module programmed to direct the processor to:

receive a request to restore the email database;

restore the email database from the backup image by, for each archived email object in the set of email objects, restoring the shortcut to the email object instead of restoring the email object.

9. The system of claim 8, further comprising:

a first email server that comprises the email database before the email database is compromised;

a backup server that comprises the backup image, wherein the backup module creates the backup image by copying data from the email database on the first email server to the backup image on the backup server.

10. The system of claim 9, further comprising:

a second email server remote from the first email server, wherein the second email server comprises the email server module.

11. The system of claim 8, wherein:

the email server module is programmed to archive the one or more objects from the set of email objects in the backup image by loading the backup image into an email application;

the archiving is performed by the email application.

12. The system of claim 8, wherein:

the email server module comprises an email exchange application;

the email database comprises an email exchange server database.

13. The system of claim 8, wherein the restoration module is programmed to:

restore each email object from the archival data store after restoring the email database from the backup image.

14. The system of claim 8, wherein:

after the set of email objects are archived, one or more email messages in the backup image consist of message metadata and one or more shortcuts to one or more email objects such that the backup image provides a skeleton image of the email database that includes header information for emails and shortcuts to email objects.

15. The system of claim 8, wherein the email objects include text from email messages.

16. A non-transitory computer-readable-storage medium comprising one or more computer-executable instructions that, when executed by a computing device, cause the computing device to:

create a backup image of an email database;

archive archiving one or more objects from a set of email objects in the backup image by, for each email object in the set of email objects:

determining whether the email object is smaller than a predetermined size;

if the email object is smaller than the predetermined size, leaving the email object in the backup image;

if the email object is larger than the predetermined size, moving the email object from the backup image to an archival data store and providing, in the backup image, a shortcut that identifies a location of the email object in the archival data store;

receive a request to restore the email database;

restore the email database from the backup image by, for each archived email object in the set of email objects, restoring the shortcut to the email object instead of restoring the email object.

17. The non-transitory computer-readable-storage medium of claim 16, wherein the one or more computer-executable instructions are programmed to cause the computing device to:

load the backup image into an email application to prepare the set of email objects in the backup image to be archived.

18. The non-transitory computer-readable-storage medium of claim 17, wherein:

the one or more objects from the set of email objects that are archived excludes email message text that is smaller than a predetermined amount and includes any email message text that exceeds the predetermined amount.

19. The non-transitory computer-readable-storage medium of claim 16, wherein the one or more computer-executable instructions are programmed to cause the computing device to:

restore each archived email object from the archival data store after restoring the email database from the backup image.

* * * * *